United States Patent [19]

Chiang

[11] Patent Number: 5,669,467
[45] Date of Patent: Sep. 23, 1997

[54] BICYCLE BRAKE ASSEMBLY

[76] Inventor: Douglas Chiang, 6F-6, 186, Setion 1, Wen Hsin Rd., Taichung, Taiwan

[21] Appl. No.: 762,142

[22] Filed: Dec. 9, 1996

[51] Int. Cl.$^6$ ................................................ B62L 1/02
[52] U.S. Cl. .................... 188/24.12; 189/24.17; 192/6 R; 74/594.1
[58] Field of Search ................ 188/2 D, 24.11, 188/24.17, 24.22, 26, 20, 24.12, 344; 192/5, 6 R; 74/594.1

[56] References Cited

U.S. PATENT DOCUMENTS

| | | | |
|---|---|---|---|
| 4,260,044 | 4/1981 | Foster | 188/24.17 X |
| 4,638,890 | 1/1987 | Lohman | 188/24.17 |
| 5,027,930 | 7/1991 | Reed | 188/24.17 X |

*Primary Examiner*—Robert J. Oberleitner
*Assistant Examiner*—Pamela J. Lipka

[57] ABSTRACT

A bicycle brake assembly includes a caliper brake mechanism attached to a bicycle frame which has a bottom bracket through which an axle is rotatably received, an activating member fixedly mounted on the axle and having a tubular portion extending from one of two sides thereof wherein the tubular portion has a threaded portion defined in an outer periphery thereof, a casing having a hole defined therein for the activating member rotatably received therein and a ring threadedly engaged with the threaded portion of the activating member, the hole of the casing having a plurality of ratchet gears extending radially from an inner periphery thereof, the activating member having a plurality of ratchets extending therefrom to contact the ratchet gears, the casing having a lug extending radially from an outer periphery thereof and a brake cable connected between the lug and the caliper brake mechanism such that the caliper brake mechanism is activated by inversely rotating cranks attached to two ends of the axle.

2 Claims, 3 Drawing Sheets

BICYCLE BRAKE ASSEMBLY

BACKGROUND OF THE INVENTION

1. Field of the Invention

The present invention relates to a brake assembly and more particularly, to a bicycle brake assembly which is operated by inversely rotating cranks of the bicycle.

2. Brief Description of the Prior Art

Generally, a conventional bicycle brake assembly is operated by grasping brake levers attached on a handlebar of the bicycle. However, for some bicycles designed for children, to brake the bicycle by the brake levers is apparently not a suitable design because children cannot provide a sufficient force to operate the brake levers. Therefore, another kind of bicycle brake assembly is used which is operated by rotating cranks of the bicycle inversely. The bicycle brake assembly operated by cranks has the following shortcomings:

(1) Most of the known brake assemblies operated by cranks include a complicated structure which is difficult to be maintained.

(2) A great numbers of parts are involved in the complicated structure such that the kind of brake assembly is always expensive.

The present invention intends to provide an improved brake assembly operated by cranks and the brake assembly includes a simple structure so as to mitigate and/or obviate the above-mentioned problems.

SUMMARY OF THE INVENTION

In one aspect of the present invention, there is provided a bicycle brake assembly which includes a pair of brake arms pivotally attached to a bicycle frame which has a bottom bracket through which an axle is rotatably received. The axle has a first end having a first threaded portion defined in an outer periphery thereof and has a threaded hole defined therein, and a second end having another threaded hole defined therein for attachment with two cranks respectively.

An activating member having a first hole defined therethrough which has a threaded inner periphery for engagement with the first threaded portion of the axle. A tubular portion extends from one of two sides of the activating member and has a second threaded portion defined in an outer periphery thereof. A plurality of ratchets extends from the activating member and are located on the same side where the tubular portion extends.

A casing has a second hole defined centrally therethrough and a plurality of ratchet gears extend radially from an inner periphery defining the second hole. A lug extends radially from an outer periphery of the casing and has a third hole defined therethrough. The activating member is rotatably received in the second hole with the ratchets contacting the ratchet gears of the casing.

A ring has an inner threaded hole defined therein for engagement with the second threaded portion of the activating member. A brake cable is connected between the pair of arms and the third hole of the lug of the casing such that the brake arms are activated by rotating the cranks inversely to rotate the casing to pull the brake cable.

It is an object of the present invention to provide a bicycle brake assembly which is operated by rotating the cranks inversely.

It is another object of the present invention to provide a bicycle brake assembly which is operated by feet. It is a further object of the present invention to provide a bicycle brake assembly which is suitable for kids to operate.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
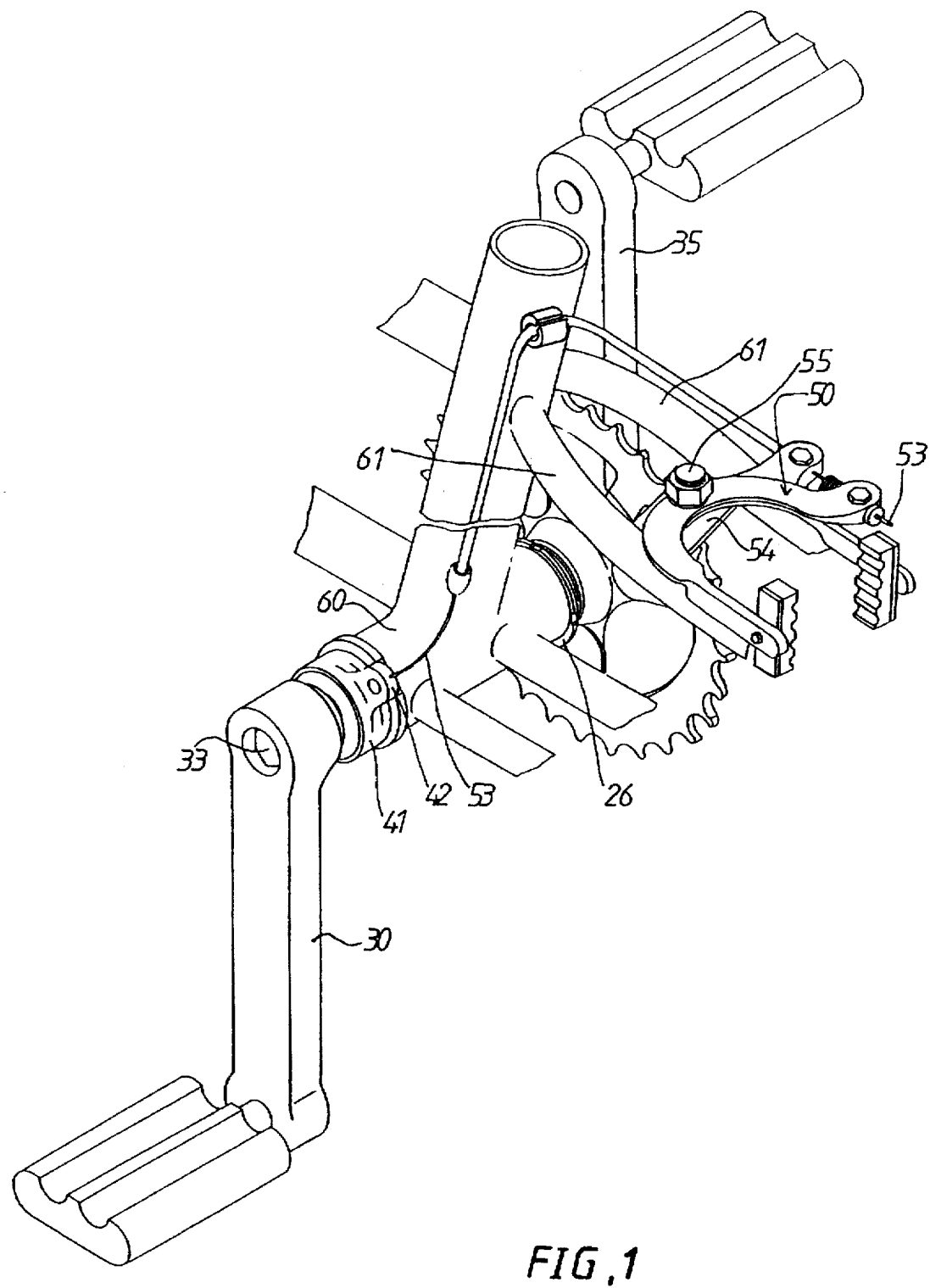
FIG. 1 is a perspective view of a bicycle brake assembly in accordance with the present invention.
Figure 2:
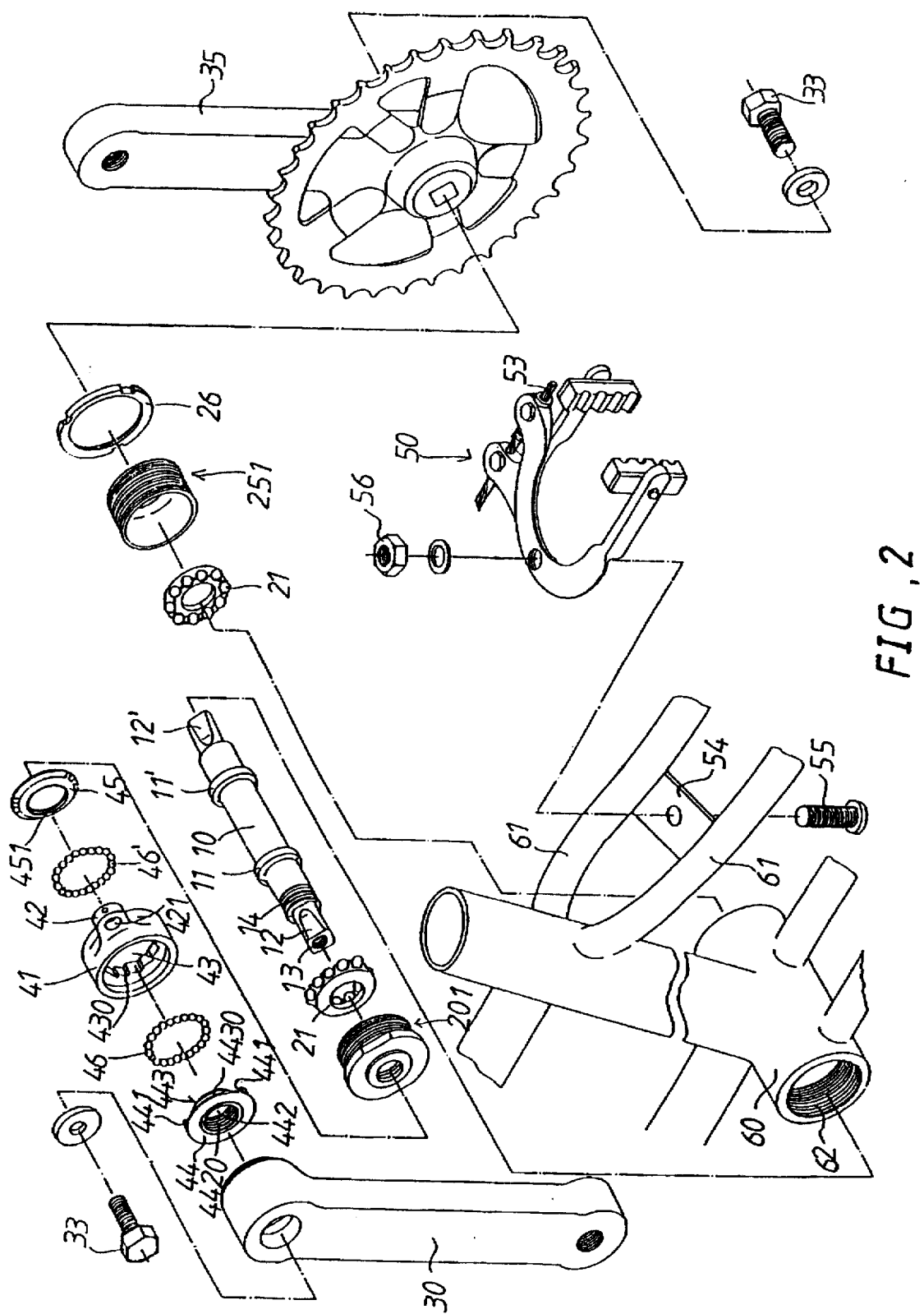
FIG. 2 is an exploded view of the bicycle brake assembly in accordance with the present invention.
Figure 3:
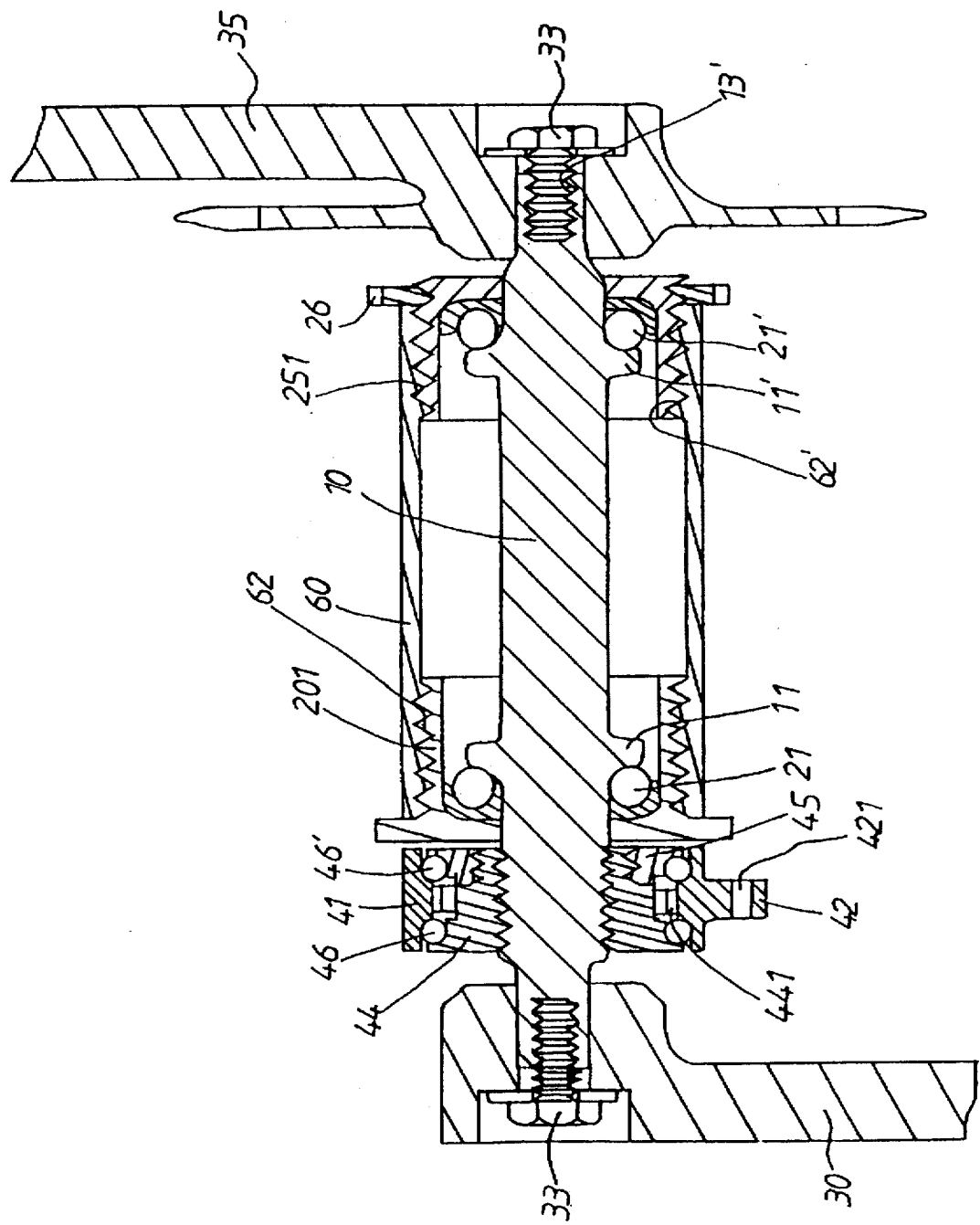
FIG. 3 is a side elevational view, partly in section, of the bicycle brake assembly in accordance with the present invention.

Referring to FIGS. 1 through 3, a bicycle brake assembly in accordance with the present invention generally includes a caliper brake mechanism 50 which is pivotally attached to a plate 54 fixedly connected between two chain stays 61 of the bicycle frame by a bolt 55 and a nut 46. The bottom bracket 60 has a threaded inner periphery 62/62' defined in each one of two ends thereof and an axle 10 is rotatably received in the bottom bracket 60. The axle 10 has a first end which has a first threaded portion 14 defined in an outer periphery thereof and has a first extension portion 12 extending longitudinally therefrom, and a second end which has a second extension portion 12' extending longitudinally therefrom. The first extension portion 12 and the second extension portion 12' respectively has a first threaded hole 13 and a second threaded hole 13' defined therein for attachment with two cranks 30, 35 respectively by bolts 33. Each of the first end and the second end of the axle 10 has a flange 11/11' extending radially therefrom. A cap 201 is threadedly engaged with the threaded inner periphery 62 of the first end of the bottom bracket with a first bearing 21 disposed between the cap 201 and the flange 11 corresponding thereto. A threaded tube 251 is threadedly engaged with another threaded inner periphery 62' of the second end of the bottom bracket 60 with a second bearing 21' disposed between the flange 11' and the threaded tube 251. A threaded ring 26 is threadedly engaged with the threaded tube 251.

An activating member 44 has a first hole 442 defined therethrough which has a threaded inner periphery 4420 for engagement with the first threaded portion 14 of the axle 10. The activating member 44 has a tubular portion 443 extending from one of two sides thereof and the tubular portion 443 has a second threaded portion 4430 defined in an outer periphery thereof. A plurality of ratchets 441 extend from the activating member 44 and are located on the same side where the tubular portion 443 extends.

A casing 41 has a second hole 43 defined centrally therethrough and a plurality of ratchet gears 430 extend radially from an inner periphery defining the second hole 43, a lug 42 extending radially from an outer periphery of the casing and having a third hole 421 defined therethrough. The activating member 44 is rotatably received in the second hole 43 with the ratchets 441 contacting the ratchet gears 430 of the casing 41.

A ring 45 has an inner threaded hole 451 defined therein for engagement with the second threaded portion 4430 of the activating member 44 wherein a third bearing 46 is disposed between the casing 41 and the activating member 44 and a fourth bearing 46' is disposed between the ring 45 and the casing 41.

A brake cable 53 is connected between the caliper brake mechanism 50 and the third hole 421 of the lug 42 of the casing 41.

The ratchet gears 430 allow the activating member 44 together with the axle 10 to be rotated in one direction to let the bicycle go forwardly while the casing 41 is maintained still. When braking the bicycle, the cranks 30, 35 are rotated inversely such that the activating member 44 is also rotated inversely, the ratchets 441 engage with the ratchet gears 430 and rotate the casing 41 inversely to pull the brake cable 53 to activate the caliper brake mechanism 50.

Accordingly, the caliper brake mechanism 50 can be operated by rotating the cranks 30, 35 and this is suitable for kids or drivers who cannot use their hands properly to operate.

Although the invention has been explained in relation to its preferred embodiment, it is to be understood that many other possible modifications and variations can be made without departing from the spirit and scope of the invention as hereinafter claimed.

What is claimed is:

1. A bicycle brake assembly comprising:

a pair of brake arms pivotally attached to a bicycle frame which has a bottom bracket, said bottom bracket having an axle rotatably received therein and said axle having a first end and a second end, said first end of said axle having a first threaded portion defined in an outer periphery thereof and having a first threaded hole defined therein, said second end of said axle having a second threaded hole defined therein for attachment with two cranks respectively;

an activating member having a first hole defined therethrough which has a threaded inner periphery for engagement with said first threaded portion of said axle, said activating member having a tubular portion extending from one of two sides thereof and said tubular portion having a second threaded portion defined in an outer periphery thereof, a plurality of ratchets extending from said activating member and located on the same side where said tubular portion extends;

a casing having a second hole defined centrally therethrough and a plurality of ratchet gears extending radially from an inner periphery defining said second hole, a lug extending radially from an outer periphery of said casing and having a third hole defined therethrough, said activating member rotatably received in said second hole with said ratchets contacting said ratchet gears of said casing;

a ring having an inner threaded hole defined therein for engagement with said second threaded portion of said activating member, and a brake cable connected between said pair of arms and said third hole of said lug of said casing.

2. The bicycle brake assembly as claimed in claim 1 wherein a bearing is disposed between said casing and said activating member and another bearing is disposed between the ring and the casing.

* * * * *